(12) United States Patent
Hisamura et al.

(10) Patent No.: US 12,344,085 B2
(45) Date of Patent: Jul. 1, 2025

(54) UTILITY VEHICLE

(71) Applicant: KAWASAKI MOTORS, LTD., Hyogo (JP)

(72) Inventors: Takashi Hisamura, Akashi (JP); Yusuke Nakashima, Akashi (JP); Yumi Miyake, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 296 days.

(21) Appl. No.: 17/818,316

(22) Filed: Aug. 8, 2022

(65) Prior Publication Data

US 2024/0042842 A1 Feb. 8, 2024

(51) Int. Cl.
*B60L 50/60* (2019.01)
*B60K 1/04* (2019.01)

(52) U.S. Cl.
CPC .............. *B60K 1/04* (2013.01); *B60L 50/66* (2019.02); *B60K 2001/0433* (2013.01)

(58) Field of Classification Search
CPC ... B60K 1/04; B60K 2001/0433; B60L 50/66; B60Y 2200/20; B60N 2/38; B60N 2/68; B60N 2002/905; B60R 11/0012
See application file for complete search history.

(56) References Cited

U.S. PATENT DOCUMENTS

2020/0189379 A1 6/2020 Hirukawa et al.

FOREIGN PATENT DOCUMENTS

JP 2007314024 A * 12/2007
JP 2019123477 A * 7/2019

* cited by examiner

*Primary Examiner* — Steve Clemmons
(74) *Attorney, Agent, or Firm* — Studebaker Brackett PLLC

(57) ABSTRACT

A utility vehicle includes a rear seat; a seat frame provided below the rear seat, the rear seat being attached to the seat frame; a supporter provided below the seat frame to support the seat frame; and a battery provided below the seat frame. The supporter further holds the battery.

7 Claims, 7 Drawing Sheets

UTILITY VEHICLE

FIELD

The technique disclosed herein relates to a utility vehicle.

BACKGROUND

For example, the specification of U.S. Patent Application Publication No. 2020/0189379 discloses a vehicle in which a battery is held below a seat.

SUMMARY

For the above-described vehicle, there is still room for improvement in simplification of a structure for holding the battery.

The technique disclosed herein has been made in view of such a point, and an object thereof is to simplify a structure for holding a battery arranged below a seat.

The utility vehicle disclosed herein includes a seat, a seat frame, a support portion, and a battery. The seat frame is provided below the seat, and the seat is attached to the seat frame. The supporter is provided below the seat frame to support the seat frame. The battery is provided below the seat frame. The supporter further holds the battery.

DESCRIPTION OF EMBODIMENTS

Hereinafter, an exemplary embodiment will be described in detail based on the drawings.

Figure 1:
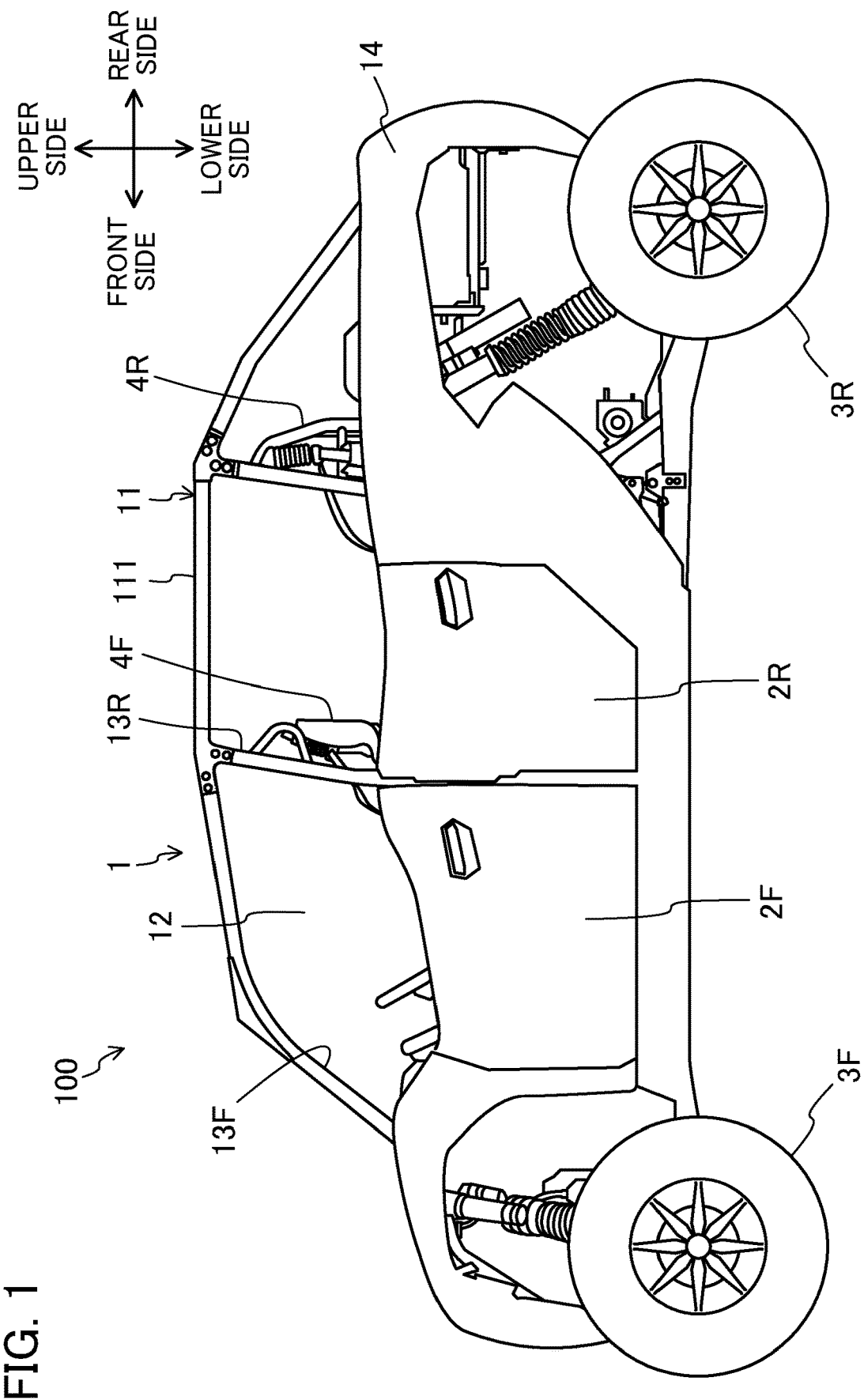
FIG. 1 is a left side view showing an outline configuration of a utility vehicle.

FIG. 1 is a left side view showing an outline configuration of a utility vehicle 100. The utility vehicle 100 is an automobile that can travel off road. The utility vehicle 100 includes a vehicle body 1, front doors 2F and rear doors 2R, front wheels 3F and rear wheels 3R, and front seats 4F and rear seats 4R.

Hereinafter, a front-rear direction will be set such that front and rear sides of the utility vehicle 100 in a traveling direction thereof is "front" and "rear," a right-left direction will be set such that right and left sides when facing the front side of the utility vehicle 100 in the traveling direction thereof are "right" and "left," and a height direction of the utility vehicle 100 will be set as an up-down direction. Moreover, the right-left direction is the same as a vehicle width direction that is a width direction of the utility vehicle 100, and for the sake of convenience in description, a vehicle compartment side in the vehicle width direction will be sometimes referred to as an "inner side in the vehicle width direction" and a vehicle outer side in the vehicle width direction will be sometimes referred to as an "outer side in the vehicle width direction."

The vehicle body 1 has a vehicle body frame 11, side covers 14, etc. The side cover 14 covers at least part of a side surface of the vehicle body frame 11. In the vehicle body 1, a cabin 12 that is a space where an occupant is present is defined and formed. A front entrance 13F and a rear entrance 13R causing the cabin 12 and the outside of the vehicle to communicate with each other are formed at a side portion of the vehicle body frame 11, i.e., a side portion of the vehicle body 1. In this example, the front entrances 13F and the rear entrances 13R are, although not shown in the figure, formed at both right and left side portions of the vehicle body 1.

The vehicle body frame 11 has a rollover protection structure 111 commonly known as ROPS. The rollover protection structure 111 protects the occupant when the utility vehicle 100 overturns. The rollover protection structure 111 defines and forms upper portions of the front entrances 13F and the rear entrances 13R.

The front door 2F opens or closes the front entrance 13F, specifically part of the front entrance 13F. The rear door 2R opens or closes the rear entrance 13R, specifically part of the rear entrance 13R. That is, the front door 2F and the rear door 2R in this example are of a so-called half door type, and do not have windows. The front wheels 3F are each provided on the right and left sides and the rear wheels 3R are each provided on the right and left sides, and these front and rear wheels 3F, 3R support the vehicle body 1.

The front seats 4F and the rear seats 4R are provided in the cabin 12. The front seat 4F and the rear seat 4R are arranged in the front-rear direction in the cabin 12. That is, the rear seat 4R is arranged at the rear of the front seat 4F. In this example, the front seats 4F are each provided on the right and left sides and the rear seats 4R are each provided on the right and left sides, although not shown in the figure.

Figure 2:
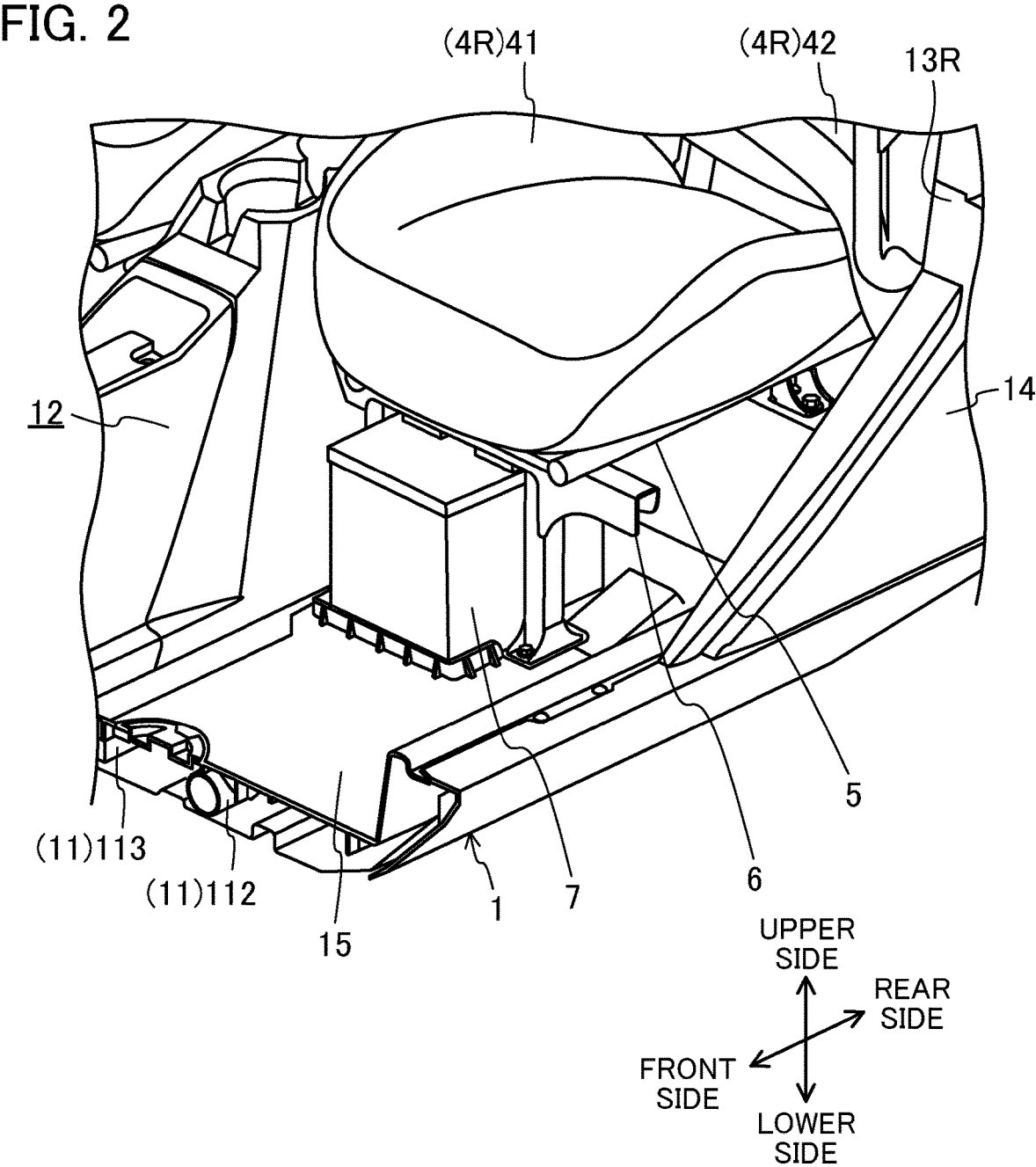
FIG. 2 is a perspective view showing a battery provided below a left rear seat and the periphery thereof diagonally from a front left side.

FIG. 2 is a perspective view showing a battery 7 provided below the left rear seat 4R and the periphery thereof diagonally from the front left side. The utility vehicle 100 further includes a seat frame 5, a supporter 6, and the battery 7.

The seat frame 5 is provided below a seat, specifically the rear seat 4R, and the rear seat 4R is attached to the seat frame 5. The rear seat 4R is one example of the seat, and is attached to the vehicle body 1 through the seat frame 5. The rear seat 4R has a seat bottom 41 and a seat back 42. The supporter 6 is provided below the seat frame 5 to support the seat frame 5.

The battery 7 is a source for supplying power necessary for driving the utility vehicle 100, such as supplying power to various electric components. The battery 7 is provided below the seat frame 5. In this example, the battery 7 is formed substantially in the shape of a rectangular body having two surfaces facing each other in the front-rear direction, two surfaces facing each other in the vehicle width direction, and two surfaces facing each other in the up-down direction.

The vehicle body 1 further has a floor panel 15 on which the battery 7 is mounted. The floor panel 15 defines and forms a bottom portion of the cabin 12. Specifically, the floor panel 15 is attached to the vehicle body frame 11, specifically a main frame 112, a sub-frame 113, etc. of the vehicle body frame 11. The main frame 112 and the sub-frame 113 extend in the front-rear direction, and are arranged in the vehicle width direction. The floor panel 15 is one example of a floor.

Figure 3:
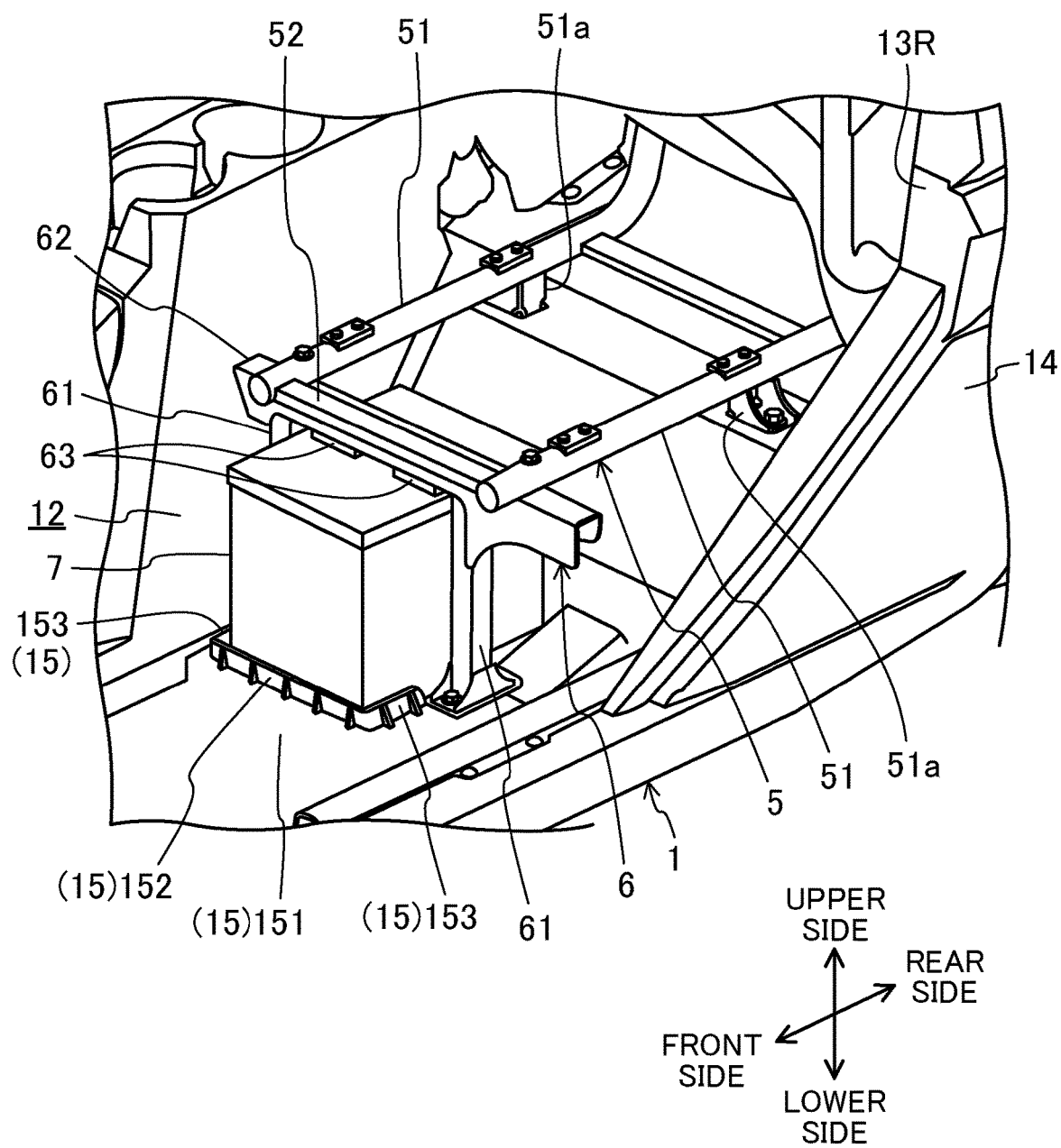
FIG. 3 is a perspective view showing a state in which the rear seat is detached from the state of FIG. 2.
Figure 4:
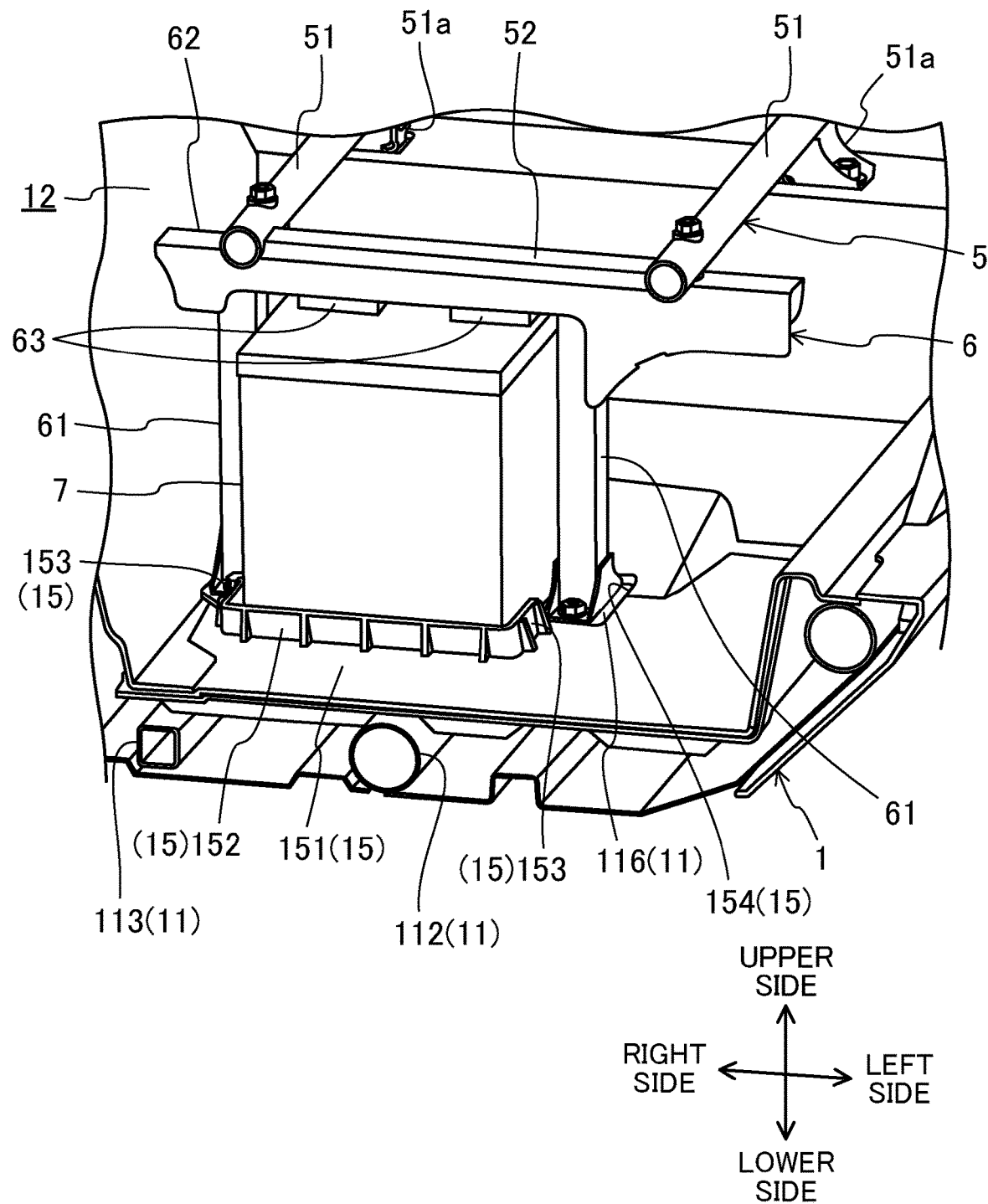
FIG. 4 is a perspective view from a position shifted to a front side as compared to the state of FIG. 3.

FIG. 3 is a perspective view showing a state in which the rear seat 4R is detached from the state of FIG. 2. FIG. 4 is a perspective view from a position shifted to the front side as compared to the state of FIG. 3.

Specifically, the seat frame 5 has a pair of first frames 51 and a second frame 52. The pair of first frames 51 extends in the front-rear direction. The pair of first frames 51 is arranged in the vehicle width direction. The second frame 52 connects the pair of first frames 51 to each other. Specifically, the second frame 52 is positioned between the pair of first frames 51, and extends in the vehicle width direction. The second frame 52 is connected to front end portions of the pair of first frames 51 in the front-rear direction.

At the seat frame 5 formed as described above, the seat bottom 41 is attached to more than the half of the pair of first frames 51 on the front side, and the seat back 42 is attached to rear portions of the pair of first frames 51.

The supporter 6 supports the seat frame 5 and holds the battery 7, as described above. That is, in this example, the supporter 6 supporting the seat frame 5 is also formed as a structure for holding the battery 7.

Specifically, the supporter 6 supports the seat frame 5 in the up-down direction, and presses the battery 7 from above against the floor panel 15 to hold the battery 7. More specifically, the supporter 6 has a pair of column bases 61 and a horizontal beam 62, and forms an inverted U-shaped frame.

The pair of column bases 61 is positioned on both sides of the battery 7, i.e., both sides of the battery 7 in the vehicle width direction. The pair of column bases 61 extends in the up-down direction. More specifically, the column base 61 extends to a position higher than an upper surface of the battery 7. The horizontal beam 62 is positioned between the seat frame 5 and the battery 7. The horizontal beam 62 connects upper portions of the pair of column bases 61 to each other. That is, the horizontal beam 62 extends in the vehicle width direction, and is connected to upper end portions of the pair of column bases 61.

Figure 5:
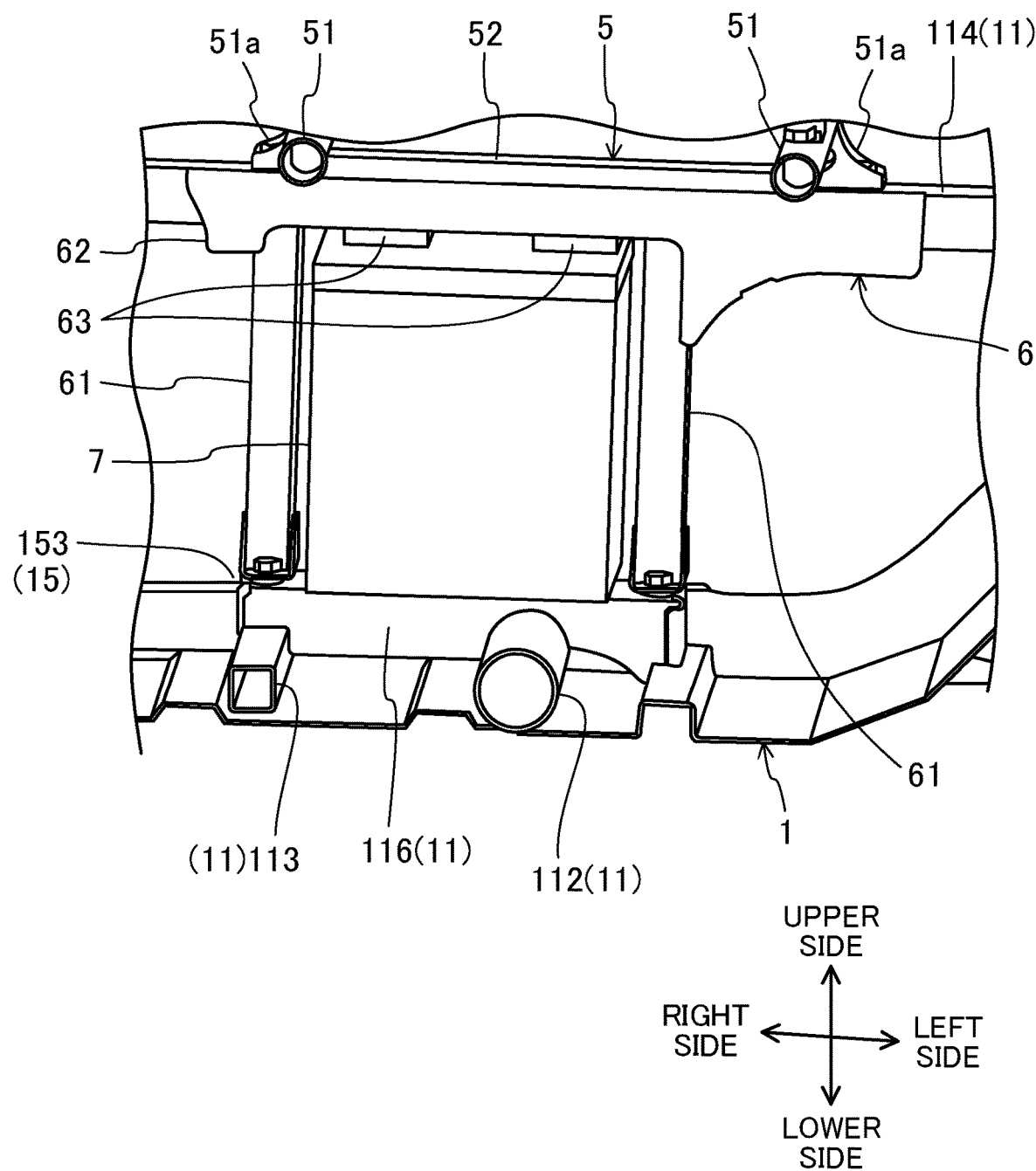
FIG. 5 is a perspective view showing the battery and the periphery thereof diagonally from an upper front side with a floor panel detached.
Figure 6:
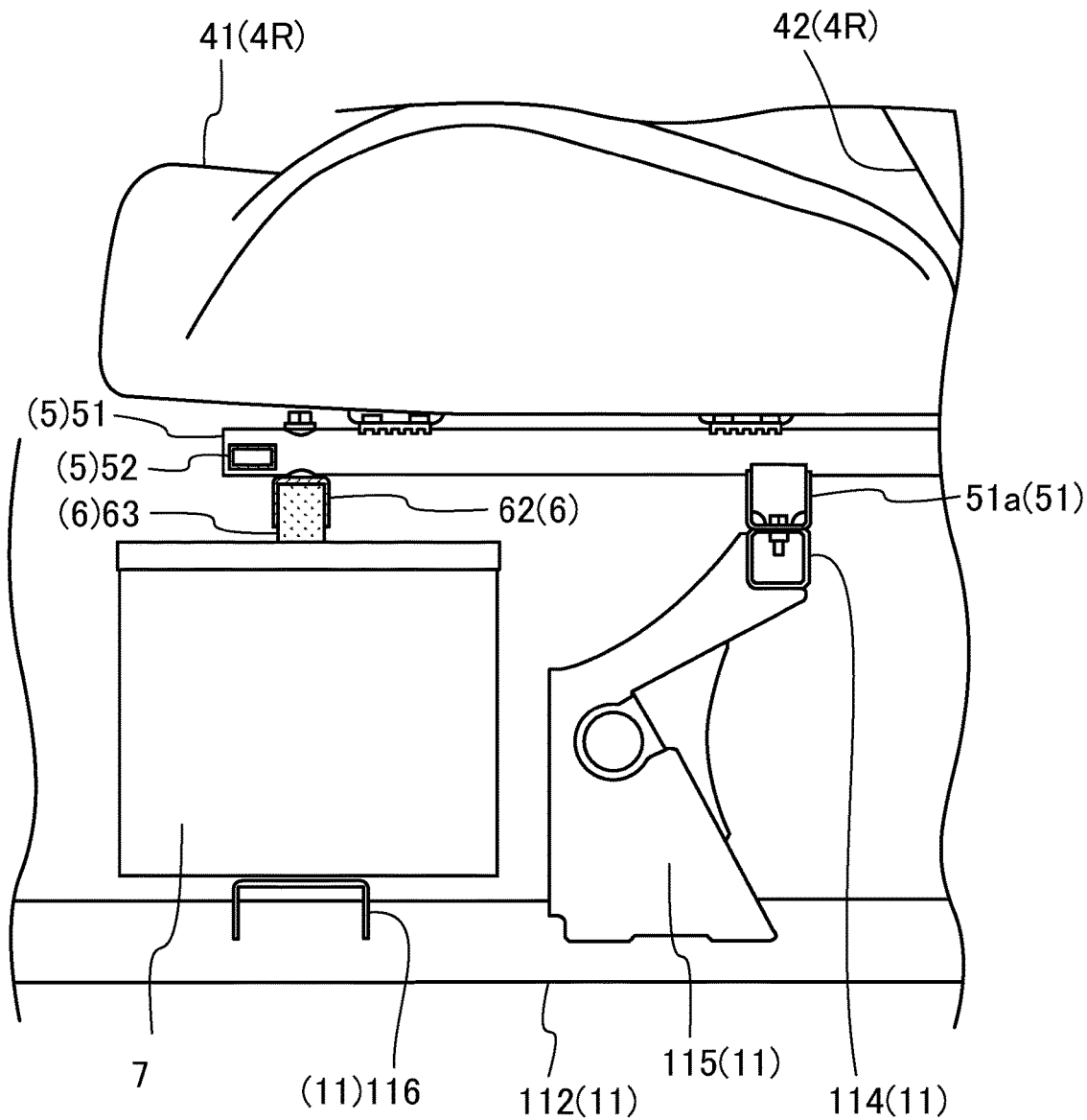
FIG. 6 is a partial sectional view showing the battery and the periphery thereof from an outer side in a vehicle width direction.

FIG. 5 is a perspective view showing the battery 7 and the periphery thereof diagonally from the upper front side with the floor panel 15 detached. FIG. 6 is a partial sectional view showing the battery 7 and the periphery thereof from the outer side in the vehicle width direction.

The seat frame 5, specifically the pair of first frames 51, is connected to an upper surface of the horizontal beam 62. Since the horizontal beam 62 positioned below the seat frame 5 is connected to the seat frame 5 as described above, the supporter 6 supports, by the horizontal beam 62, the seat frame 5 in the up-down direction. In this example, the supporter 6 supports the seat frame 5, i.e., front end portions of the pair of first frames 51 in the front-rear direction, as shown in FIG. 6.

The supporter 6 is fixed to the vehicle body frame 11. Specifically, as shown in FIG. 5, lower end portions of the pair of column bases 61 are fixed to a front cross member 116 of the vehicle body frame 11. The front cross member 116 is positioned below the floor panel 15 as are the main frame 112 and the sub-frame 113. The front cross member 116 extends in the vehicle width direction, and is coupled to the main frame 112 and the sub-frame 113. That is, the front side of the seat frame 5 is indirectly supported by the main frame 112 and the sub-frame 113.

Note that cutouts 154 formed by cutting out portions of the floor panel 15 corresponding to the lower end portions of the column bases 61 are provided at the floor panel 15. The lower end portions of the column bases 61 are directly fixed to the front cross member 116 through the cutouts 154.

The rear side of the seat frame 5 is supported by the vehicle body frame 11. Specifically, as shown in FIG. 6, the rear side of the pair of first frames 51 is fixed to a rear cross member 114 of the vehicle body frame 11 through attachment members 51a. The rear cross member 114 is positioned higher than the main frame 112, and extends in the vehicle width direction. The rear cross member 114 is coupled to the main frame 112 through a coupling member 115. That is, the rear side of the seat frame 5 is indirectly supported by the main frame 112.

The supporter 6 presses, by the horizontal beam 62, the battery 7 against the floor panel 15. More specifically, the supporter 6 further has rubber members 63 provided at the horizontal beam 62. The supporter 6 presses, by the horizontal beam 62, the battery 7 against the floor panel 15 through the rubber members 63.

The rubber members 63 are attached to a lower portion of the horizontal beam 62. In this example, two rubber members 63 are provided. These two rubber members 63 are provided along the direction of extension of the horizontal beam 62. The rubber members 63 are provided in contact with the upper surface of the battery 7. The rubber member 63 is one example of an elastic member, and is a member having elasticity in the up-down direction. More specifically, the supporter 6 is provided in a state in which the rubber members 63 are contracted in the up-down direction, i.e., a state in which elastic force of the rubber members 63 in the up-down direction acts. With this configuration, the supporter 6 presses, by the horizontal beam 62, the battery 7 downward through the rubber members 63. Thus, the battery 7 is held.

As described above, in the utility vehicle 100, the supporter 6 supporting the seat frame 5 also holds the battery 7, and therefore, the number of components in the structure for holding the battery 7 is reduced. Thus, the structure for holding the battery 7 is simplified.

The supporter 6 supports the seat frame 5 in the up-down direction, and presses the battery 7 from above against the floor panel 15 to hold the battery 7. Thus, a downward load acting on the supporter 6 from the seat frame 5 can be utilized as a pressing force of pressing the battery 7. Consequently, the force of pressing the battery 7 can be easily earned.

The supporter 6 supports a front end portion of the seat frame 5. Thus, the seat frame 5 can be supported at the front and rear end portions. Consequently, the seat frame 5 can be properly supported as compared to, e.g., a case where a supporter supports a portion of the seat frame 5 other than an end portion. As a result, the seat frame 5 can be properly supported, and the force of pressing the battery 7 can be earned.

The supporter 6 is formed as a so-called gate-shaped frame having the pair of column bases 61 and the horizontal beam 62, and by the horizontal beam 62, supports the seat frame 5 and presses the battery 7. Thus, the supporter 6 can widely support the seat frame 5 along the direction of extension of the horizontal beam 62 while widely pressing the battery 7 along the direction of extension of the horizontal beam 62. Consequently, the seat frame 5 is uniformly supported, and the battery 7 is uniformly held.

The horizontal beam 62 of the supporter 6 presses the battery 7 through the rubber members 63. With this configuration, the battery 7 is pressed by the elastic force of the rubber members 63. Thus, action of excessive pressing force on the battery 7 is reduced as compared to, e.g., a case where the horizontal beam 62 directly presses the battery 7.

Figure 7:
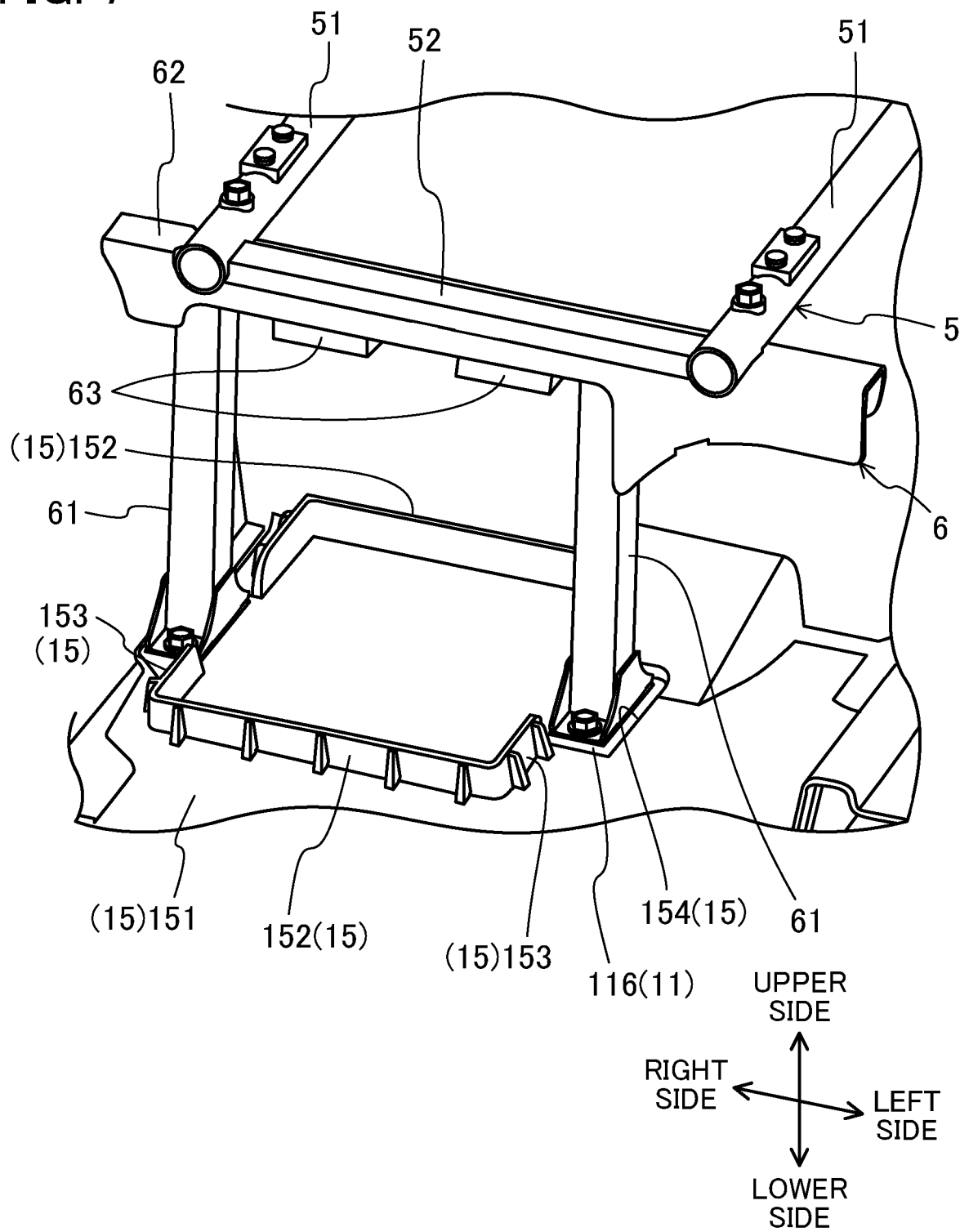
FIG. 7 is a perspective view showing a state in which the battery is detached from the state of FIG. 4.

FIG. 7 is a perspective view showing a state in which the battery 7 is detached from the state of FIG. 4. The floor panel 15 in this example has a floor body 151 and first positioners 152 and second positioners 153 formed integrally with the floor body 151. The first positioners 152 and the second positioners 153 are formed as part of the structure for holding the battery 7.

The floor body 151 is a plate member extending in a horizontal planar shape. The first positioners 152 and the second positioners 153 determine the position of the battery 7 in at least one of the front-rear direction or the vehicle width direction. In this example, the first positioners 152 and the second positioners 153 determine the position of the battery 7 in both the front-rear direction and the vehicle width direction. The first positioner 152 and the second positioner 153 are one example of a positioner.

Specifically, the first positioners 152 determine the position of the battery 7 in the front-rear direction. The first positioners 152 are each provided on the front and rear sides of the battery 7. The first positioner 152 is a plate-shaped frame extending in the vehicle width direction. The first positioner 152 protrudes upward of an upper surface of the floor body 151.

The second positioners 153 determine the position of the battery 7 in the vehicle width direction. The second positioners 153 are each provided on both sides of the battery 7 in the vehicle width direction. The second positioner 153 is a plate-shaped frame extending in the front-rear direction. The second positioner 153 protrudes upward of the upper surface of the floor body 151 as in the first positioner 152. Note that the second positioner 153 is divided at a position corresponding to the column base 61.

The first positioners 152 and the second positioners 153 are connected to each other at end portions. Specifically, the first positioners 152 and the second positioners 153 form a frame-shaped member having a size slightly larger than that of the battery 7 as viewed from above. The battery 7 is mounted inside the frame-shaped member, and therefore, the position of the battery 7 in the front-rear direction and the vehicle width direction is determined.

In other words, the battery 7 contacts the first positioners 152, and accordingly, displacement of the battery 7 in the front-rear direction is restricted. Moreover, the battery 7 contacts the second positioners 153, and accordingly, displacement of the battery 7 in the vehicle width direction is restricted. Since displacement of the battery 7 is restricted as described above, the battery 7 is stably held.

As described above, the first positioners 152 and the second positioners 153 determining the position of the battery 7 are formed integrally with the floor body 151 of the floor panel 15. Thus, the number of components in the structure for holding the battery 7 is reduced.

As described above, the utility vehicle 100 includes the rear seat 4R; the seat frame 5 provided below the rear seat 4R, the rear seat 4R being attached to the seat frame 5; the supporter 6 provided below the seat frame 5 to support the seat frame 5; and the battery 7 provided below the seat frame 5. The supporter 6 further holds the battery 7.

According to this configuration, the supporter 6 supporting the seat frame 5 also holds the battery 7. That is, according to the utility vehicle 100, the battery 7 is held utilizing the supporter 6 supporting the seat frame 5. Thus, the number of components in the structure for holding the battery 7 can be reduced. Consequently, the structure for holding the battery 7 can be simplified.

The utility vehicle 100 further includes the floor panel 15 on which the battery 7 is mounted. The supporter 6 supports the seat frame 5 in the up-down direction, and presses the battery 7 from above against the floor panel 15 to hold the battery 7.

According to this configuration, a downward load acting on the supporter 6 from the seat frame 5 can be utilized as the pressing force of pressing the battery 7. Thus, the force of pressing the battery 7 can be easily and effectively earned.

The supporter 6 supports the front end portion of the seat frame 5 in the front-rear direction.

According to this configuration, the seat frame 5 can be supported at the front and rear end portions. Thus, the seat frame 5 can be properly supported as compared to, e.g., the case where the supporter supports the portion of the seat frame 5 other than the end portion. Consequently, the seat frame 5 can be properly supported, and the force of pressing the battery 7 can be earned.

The supporter 6 has the pair of column bases 61 positioned on both sides of the battery 7 in the vehicle width direction and extending in the up-down direction and the horizontal beam 62 positioned between the seat frame 5 and the battery 7 and connecting the upper portions of the pair of column bases 61 to each other. By the horizontal beam 62, the supporter 6 supports the seat frame 5 and presses the battery 7 against the floor panel 15.

According to this configuration, the horizontal beam 62 supports the seat frame 5 and presses the battery 7. Thus, the supporter 6 can widely support the seat frame 5 along the direction of extension of the horizontal beam 62 while widely pressing the battery 7 along the direction of extension of the horizontal beam 62. Consequently, the seat frame 5 can be uniformly supported, and the battery 7 can be uniformly held. As a result, a function of holding the battery 7 can be stabilized.

The supporter 6 further has the rubber members 63 provided at the horizontal beam 62. The supporter 6 presses, by the horizontal beam 62, the battery 7 against the floor panel 15 through the rubber members 63.

According to this configuration, the battery 7 is pressed by the elastic force of the rubber members 63. Thus, action of excessive pressing force on the battery 7 can be reduced as compared to, e.g., the case where the horizontal beam 62 directly presses the battery 7. Consequently, damage of the battery 7 due to the excessive pressing force can be prevented.

The supporter 6 is fixed to the vehicle body frame 11 to which the floor panel 15 is attached.

According to this configuration, the supporter 6 is supported by the vehicle body frame 11. The vehicle body frame 11 is a member having a relatively-high strength in the utility vehicle 100, and therefore, the supporter 6 is firmly supported. Thus, for the supporter 6, a function of supporting the seat frame 5 and the function of holding the battery 7 can be enhanced.

The floor panel 15 has the floor body 151 and the first positioners 152 and the second positioners 153 formed integrally with the floor body 151 and determining the position of the battery 7 in both the front-rear direction and the vehicle width direction.

According to this configuration, the position of the battery 7 in both the front-rear direction and the vehicle width direction can be determined. That is, displacement of the battery 7 in the front-rear direction and the vehicle width direction can be restricted by the first positioners 152 and the second positioners 153. Thus, the battery 7 can be more stably held. The first positioners 152 and the second positioners 153 as described above are formed integrally with the floor body 151 of the floor panel 15. That is, part of the floor panel 15 is formed as the structure for holding the battery 7. Thus, the number of components can be reduced. Consequently, the structure for holding the battery 7 can be further simplified.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described in the above-described embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, in the above-described embodiment, either the first positioners 152 or the second positioners 153 may be omitted.

Alternatively, both the first positioners 152 and the second positioners 153 may be omitted.

The first positioners 152 and the second positioners 153 are not necessarily formed integrally with the floor body 151 of the floor panel 15, and may be formed as independent members separated from the floor panel 15.

The supporter 6 may be fixed to the vehicle body 1 at a portion other than the vehicle body frame 11.

The supporter 6 is not limited to one supporter 6, and a plurality of supporters 6 may be provided according to the size of the battery 7, for example. In this case, the plurality of supporters 6 is, for example, arranged in the front-rear direction.

The shape of the supporter 6 is not limited to the above-described gate-shaped frame, and may be any shape as long as the supporter 6 can support the seat frame 5 and hold the battery 7.

The number of rubber members 63 is not limited to that described above, and may be one or three or more, needless to say.

The elastic member provided at the horizontal beam 62 is not limited to the rubber member 63, and for example, may be a spring having elasticity in the up-down direction.

The supporter 6 may be formed without the rubber members 63.

The technique disclosed herein is not limited to the form in which the battery 7 is arranged below the left rear seat 4R, and is similarly applicable to a form in which the battery 7 is arranged below the right rear seat 4R and a form in which the battery 7 is arranged below the front seat 4F.

What is claimed:

1. A utility vehicle comprising:
a seat;
a seat frame provided below the seat, the seat being attached to the seat frame;
a supporter provided below the seat frame to support the seat frame;
a battery provided below the seat frame, the battery having two opposing side surfaces facing each other in a vehicle width direction, and
a floor on which the battery is mounted;
wherein the supporter further holds the battery,
the supporter has a pair of column bases, each of the pair of column bases positioned proximal one of the opposing side surfaces of the battery in the vehicle width direction and extending in the up-down direction, and a horizontal beam positioned between the seat frame and the battery and connecting upper portions of the pair of column bases to each other,
the floor has a positioner which determines a position of the battery in at least one of a vehicle front-rear direction and the vehicle width direction, the positioner being divided in the vehicle front-rear direction and including a front positioner body and a rear positioner body disposed at the rear of the front positioner body, and
the column bases are respectively disposed at locations corresponding to rear ends of the front positioner body.

2. The utility vehicle of claim 1,
wherein the supporter supports the seat frame in an up-down direction, and presses the battery from above against the floor to hold the battery.

3. The utility vehicle of claim 2, wherein
the supporter supports a front end portion of the seat frame in a front-rear direction.

4. The utility vehicle of claim 2, wherein
by the horizontal beam, the supporter supports the seat frame and presses the battery against the floor.

5. The utility vehicle of claim 4, wherein
the supporter further has an elastic member provided at the horizontal beam, and by the horizontal beam, presses the battery against the floor through the elastic member.

6. The utility vehicle of claim 2, wherein
the supporter is fixed to a vehicle body frame to which the floor is attached.

7. The utility vehicle of claim 2, wherein
the floor has a floor body and the positioner is formed integrally with the floor body.

* * * * *